(12) United States Patent
Mutalik Desai

(10) Patent No.: US 11,163,742 B2
(45) Date of Patent: Nov. 2, 2021

(54) SYSTEM AND METHOD FOR GENERATING IN-MEMORY TABULAR MODEL DATABASES

(71) Applicant: Microsoft Technology Licensing, LLC, Redmond, WA (US)

(72) Inventor: Vijay Mohan Mutalik Desai, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 218 days.

(21) Appl. No.: 16/244,965

(22) Filed: Jan. 10, 2019

(65) Prior Publication Data

US 2020/0226117 A1 Jul. 16, 2020

(51) Int. Cl.
*G06F 16/22* (2019.01)
*G06F 16/28* (2019.01)
*G06F 16/2455* (2019.01)
*G06F 40/205* (2020.01)

(52) U.S. Cl.
CPC ...... *G06F 16/2282* (2019.01); *G06F 16/2455* (2019.01); *G06F 16/283* (2019.01); *G06F 16/284* (2019.01); *G06F 40/205* (2020.01)

(58) Field of Classification Search
CPC .................................................. G06F 16/2282
USPC ........................................................ 707/713
See application file for complete search history.

(56) References Cited

U.S. PATENT DOCUMENTS

| | | | | |
|---|---|---|---|---|
| 2002/0059183 | A1* | 5/2002 | Chen | G06F 16/2428 |
| 2005/0246357 | A1* | 11/2005 | Geary | G06F 16/283 |
| 2009/0138386 | A1* | 5/2009 | Wilson, Jr. | G06Q 40/12 705/30 |
| 2011/0246962 | A1* | 10/2011 | Meijer | G06F 16/284 717/106 |
| 2013/0103638 | A1* | 4/2013 | Gupta | G06F 16/283 707/603 |
| 2015/0134601 | A1* | 5/2015 | Anderson | G06F 16/24578 707/609 |
| 2016/0335303 | A1* | 11/2016 | Madhalam | G06F 16/252 |
| 2017/0161323 | A1* | 6/2017 | Simitsis | G06F 16/248 |

(Continued)

OTHER PUBLICATIONS

"Data warehouse", Retrieved from: https://en.wikipedia.org/w/index.php?t%20itle=Data%20warehouse&oldid=875960845#Facts, Dec. 30, 2018, 11 Pages.

(Continued)

*Primary Examiner* — Syling Yen
(74) *Attorney, Agent, or Firm* — Fiala & Weaver P.L.L.C.

(57) ABSTRACT

Methods, systems, apparatuses, and computer program products are provided for generating a tabular model. An event model is generated that comprises a plurality of events and one or more dependencies between each event. For instance, the events and dependencies may be identified through interaction with a graphical user interface (GUI), such as an event studio. A plurality of dimensions is mapped to each event and event records are obtained related to the event model. A presentation database is generated for the event model. Using the presentation database, a tabular model may be generated. In some implementations, the tabular model may be stored and/or presented as a tabular cube in a platform for analyzing transactional data.

20 Claims, 12 Drawing Sheets

(56) References Cited

U.S. PATENT DOCUMENTS

2018/0024701 A1* 1/2018 Sanches ............... G06F 16/178
                                                          715/781
2018/0025093 A1* 1/2018 Xia ................... G06F 16/90335
                                                          707/602
2019/0050464 A1* 2/2019 Nothnagel ............ G06F 16/254

OTHER PUBLICATIONS

"Graphical User Interface", Retrieved from: https://en.wikipedia.org/w/index.phptitle=Graphical_user_interface&oldid=877070492, Jan. 6, 2019, 10 Pages.

"Microsoft Analysis Services", Retrieved from: https://en.wikipedia.org/w/index.php?title=Microsoft_Analysis_Services&oldid=876973187, Jan. 5, 2019, 6 Pages.

Liu et al., "E-Cube: Multi-Dimensional Event Sequence Analysis Using Hierarchical Pattern Query Sharing", In Proceedings of the International Conference on Management of Data, Jun. 12, 2011, pp. 889-900.

"International Search Report and Written Opinion Issued in PCT Application No. PCT/US2019/067692", dated May 7, 2020, 19 Pages.

Corr, Lawrence, et al., Agile Data Warehouse Design: Collaborative Dimensional Modeling, from Whiteboard to Star Schema, DecisionOne Press, 2011.

Hughes, Ralph, Agile Data Warehousing for the Enterprise: A Guide for Solution Architects and Project Leaders, Elsevier, 2016.

\* cited by examiner

SYSTEM AND METHOD FOR GENERATING IN-MEMORY TABULAR MODEL DATABASES

BACKGROUND

Solutions to visualize and interpret transactional data may comprise numerous platforms for different types of data. For instance, businesses may desire to view various aspects of prior sales to better understand the nature of such sales, the cost and/profits, the locations at which sales occurred, etc. One such solution on which business intelligence teams may rely include tabular cubes that may be presented in various types of data analytics packages. Using a tabular cube, a company may visualize and/or understand a company's transactions from various viewpoints and obtain valuable insights, which may enable to the company to improve future sales or otherwise alter its business strategies.

However, existing approaches to build and maintain tabular cubes are typically manual and time-consuming processes. For example, when a tabular cube is built from scratch, each of the various source systems from which data is to be obtained is identified, including each of the columns and/or rows in databases stored in such source systems. The data is extracted into a staging database through an execution of one or more Structured Query Language (SQL) commands. In order to render the content in a presentable format, various transformations are performed, and the data may be placed into a presentation database that is used to design a tabular cube in a suitable software or analysis package. As a result, preparing data (e.g., in the staging and presentation databases) requires engineers to understand details regarding the business process and all of the relevant source systems (e.g., payment systems, salary information, etc.) to pull and format the data in an appropriate fashion.

If the tabular cube is subsequently desired to be modified (e.g., by identifying additional data presented in a new column of a source system or obtaining information from a different source system altogether), additional manual and time-consuming steps need to be undertaken, including modifying one or more SQL commands to pull new source data, updating a schema in the staging database, modifying a presentation database schema, and modifying the tabular model. As a result, the generation of a tabular cube becomes delayed, often by several weeks, resulting in an inability to timely analyze transaction data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for generating a tabular model. An event model is generated that comprises a plurality of events and one or more dependencies between each event. For instance, the events and dependencies may be identified through interaction with a graphical user interface (GUI), such as an event studio. A plurality of dimensions is mapped to each event and event records are obtained related to the event model. A presentation database is generated for the event model. Using the presentation database, a tabular model may be generated. In some implementations, the tabular model may be stored and/or presented as a tabular cube in a platform for analyzing transactional data.

In accordance with implementations described herein, a tabular model may be generated and/or updated more quickly. In this manner, users of analysis platforms (e.g., business intelligence solutions) may be enabled to create, view, and/or modify data presented in a tabular cube more efficiently.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
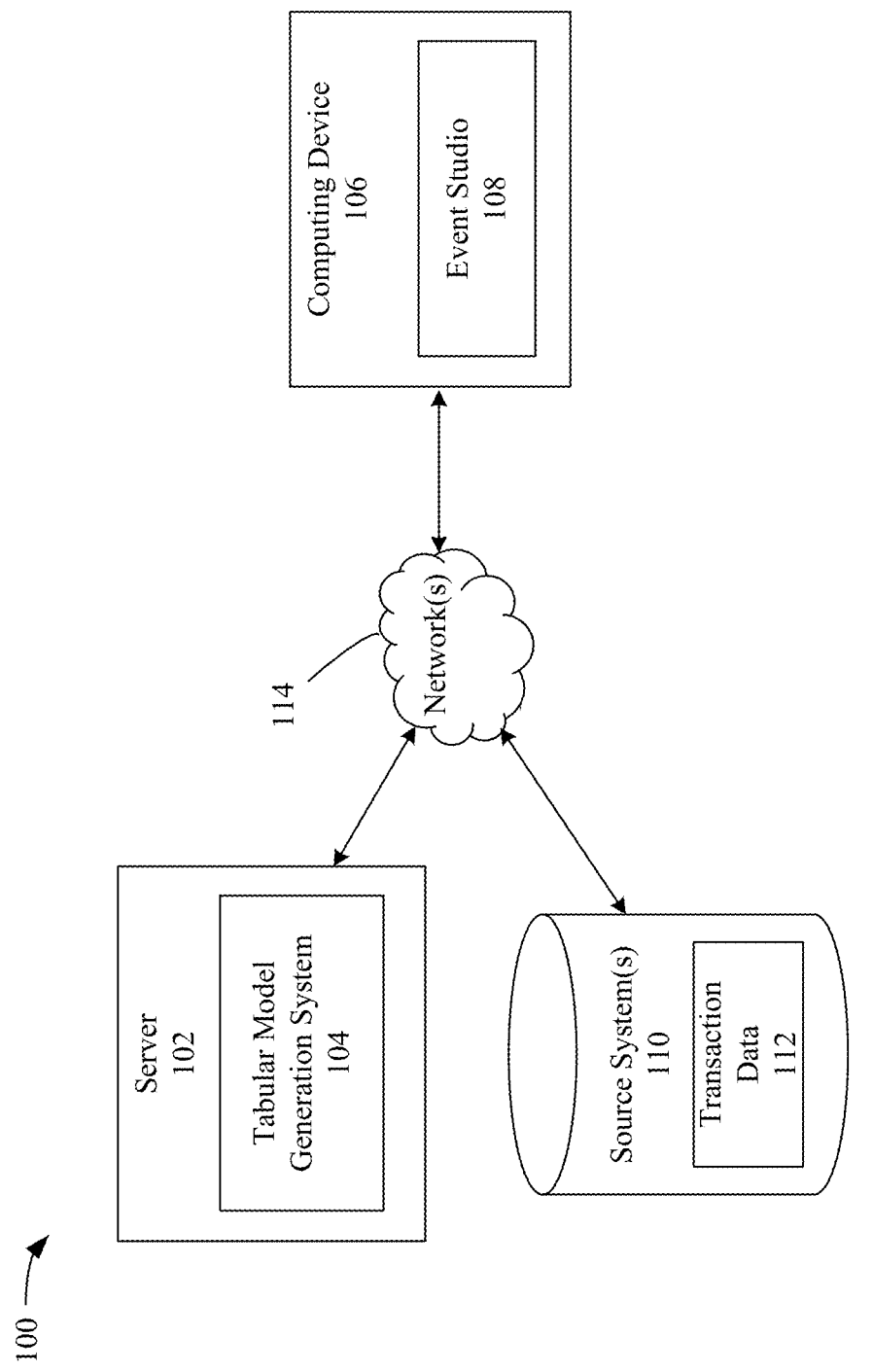
FIG. 1 shows a block diagram of a system for generating a tabular model, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Solutions to visualize and interpret transactional data may comprise numerous platforms for different types of data. For instance, businesses may desire to view various aspects of prior sales to better understand the nature of such sales, the cost and/profits, the locations at which sales occurred, etc. One such solution on which business intelligence teams may rely include tabular cubes that may be presented in various types of data analytics packages. Using a tabular cube, a company may visualize and/or understand a company's transactions from various viewpoints and obtain valuable insights, which may enable to the company to improve future sales or otherwise alter its business strategies.

However, existing approaches to build and maintain tabular cubes are typically manual and time-consuming processes. For example, when a tabular cube is built from scratch, each of the various source systems from which data is to be obtained is identified, including each of the columns and/or rows in databases stored in such source systems. The data is extracted into a staging database through an execution of one or more Structured Query Language (SQL) commands. In order to render the content in a presentable format, various transformations are performed, and the data may be placed into a presentation database that is used to design a tabular cube in a suitable software or analysis package. As a result, preparing data (e.g., in the staging and presentation databases) requires engineers to understand details regarding the business process and all of the relevant source systems (e.g., payment systems, salary information, etc.) to pull and format the data in an appropriate fashion.

If the tabular cube is subsequently desired to be modified (e.g., by identifying additional data presented in a new column of a source system or obtaining information from a different source system altogether), additional manual and time-consuming steps need to be undertaken, including modifying one or more SQL commands to pull new source data, updating a schema in the staging database, modifying a presentation database schema, and modifying the tabular model. As a result, the generation of a tabular cube becomes delayed, often by several weeks, resulting in an inability to timely analyze transaction data.

Embodiments described herein address these and other issues by providing a system for generating a tabular model. In the system, an event model generator may generate an event model that includes different events along with an identification of one or more dependencies between each of the events. The event model may be generated, in part, through an interaction with a GUI, such as an event studio. An event recorder is configured to map dimensions to each of the events. The event recorder may also obtain records for the events and generate a hypergeneralized staging database. A warehouse builder may generate a presentation database for the event model, which may comprise one or more fact tables and a plurality of dimension tables. Using the fact and dimension tables from the presentation database, a tabular model builder can generate a tabular model that may be stored and/or presented in a suitable platform for analyzing transactional data.

Generating a tabular model in this manner has numerous advantages, including enabling business intelligence teams to implement and deploy such models to analysts with reduced manual effort, thereby enabling a quicker turnaround time. Furthermore, by generating a tabular model in this fashion, processing resources may be reduced, thereby improving the computing systems on which such models are generated. For example, the number of queries executed to retrieve transactional data from source systems during the generation and subsequent modifications of a tabular model may be reduced, which may improve performance of computer system.

In addition, while other techniques typically require retrieving a greater amount of transactional data to place in a staging database than is desired for the tabular model, implementations described herein enable the retrieval of data to include in a given tabular model in an iterative manner, allowing the model to be scaled up or down based on the actual needs of the analysts. As a result, processing and memory resources may be better utilized based on the actual data desired to be included in the model. Furthermore, such scaling up or down may enable analysts to intentionally omit the retrieval of certain sensitive information (e.g., email addresses, login information, etc.) from source systems, thereby improving the security of the computing systems involved in the generation of tabular models.

Additionally, by generating a tabular model as described herein, the existing technological processes of data analysis, data insights, and/or data visualization executing on one or more computing systems are also improved. For instance, by enabling tabular models to be generated in an easier, quicker, and more efficient manner, business intelligence teams may more readily understand and interpret transactional data for their company. Accordingly, technological processes of tabular model generation are greatly improved.

Example implementations are described as follows that are directed to a tabular model generation system. For instance, FIG. 1 shows a block diagram of an example system 100 for generating a tabular model, according to an example embodiment. As shown in FIG. 1, system 100 includes a server 102, a computing device 106, and one or more source system(s) 110, which may be communicatively coupled by one or more network(s) 114. Server 102 includes a tabular model generation system 104 for generating a tabular model in accordance with implementations described herein. Computing device 106 includes an event studio 108, which may comprise a graphical user interface (GUI) or the like for interacting with tabular model generation system 104, among other things. Source system(s) 110 includes transaction data 112. System 100 is further described as follows.

Network 114 may include one or more of a local area network (LAN), a wide area network (WAN), a personal area network (PAN), and/or a combination of communication networks, such as the Internet. Server 102, computing device 106, and source system(s) 110 are communicatively connected to each other via network 114. In an implementation, server 102, computing device 106, and source system(s) 110 may communicate via one or more application programming interfaces (API), and/or according to other interfaces and/or techniques.

Server 102, computing device 106, and source system(s) 110 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc.

Server 102 may include one or more server devices and/or other computing devices, co-located or located remotely, comprising, for instance, a cloud-based computing platform. In examples, server 102 may also be communicatively coupled to a storage or other repository, such as a storage device comprising one or more databases, spreadsheets, data warehouses, etc. for storing transaction-related events. In one implementation, such a storage may be local to server 102. In other implementations, such a storage may be remotely located with respect to server 102 (e.g., in one or more source system(s) 110, described below). Server 102 may also comprise, or be communicatively coupled to, one or more physical storage devices for storing a tabular model described herein, including but not limited to one or more local storage devices and/or one or more cloud-based storage devices. Examples of such storage devices include hard disk drives, solid state drives, random access memory (RAM) devices, etc. An example computing device that may incorporate the functionality of server 102 is described below in reference to FIG. 9.

Tabular model generation system 104 is configured to automatically generate a tabular model in accordance with techniques described herein. A tabular model may comprise an in-memory database comprising relational information between various database fields (e.g., in different tables) for presentation to users via one or more software interfaces. A tabular model may comprise a SQL Server Analysis Services (SSAS) tabular cube, as provided by Microsoft Corporation®, although this example is not intended to be limiting. Tabular models may be generated for deployment in any one or more of a number of software packages for Business Intelligence (BI) solutions, such as Microsoft® Azure Analysis Services, Microsoft® Power BI, or other software packages such as Microsoft® Power View or Microsoft® Excel. These software packages are mentioned herein by way of illustration only, and embodiments may include any other software packages for generating data analyses and enabling the interaction with such analyses, and may execute locally or remotely (e.g., on a cloud-computing platform), or be implemented in other solutions such as Online Analytical Processing (OLAP) cubes. Such a tabular model or cube deployed to one or of more of these software solutions may enable a user to view data from various viewpoints or dimensions to derive valuable data insights, such as business insights.

Tabular model generation system 104 may be configured to automatically generate a tabular cube from transactional data 112 in one or more source system(s) 110 (or any other operational databases). As described in greater detail below, tabular model generation system 104 may be configured to generate an event model that identifies a plurality of related events (e.g., business events) along with dependencies between each event. Dimensions, such as descriptive aspects (e.g., a name or identifier of a person, a retail location or any other geographic place, an object, etc.) related to the event and/or measures that describe quantitative elements of events or facts (e.g., quantities, sales amounts, unit prices, etc.) may be mapped to each event. A hypergeneralized staging database may be configured to store event records related to the event model and a presentation database may subsequently be generated. Using the presentation database, tabular model generation system 104 may be configured to generate a fact table and a plurality of dimension tables, which may be used in the generation of a tabular model. The generated cube may be stored in memory (e.g., RAM) and/or presented in one or more business intelligence solutions described herein that may access the tabular model. In this manner, a tabular model may be generated in a rapid, agile, and scalable manner that may enable analysts and other responsible entities to analyze data more effectively and support daily decision-making processes for a business. Tabular model generation system 104 will be described in further detail below.

Computing device 106 may comprise any device configured to enable a user, such as a member of a business intelligence team or an analyst, to build, modify, update, and/or interact with tabular model generation system 104 (or a tabular model generated therefrom). In some example embodiments, event studio 108 may enable a user to identify events, such as business events of a company, along with dependencies between one or more events. Event studio 108 may comprise any suitable interface, such as a GUI, for enabling a user to identify such events and dependencies. In some further implementations, event studio 108 may also enable a user to view, input, and/or modify one or more SQL commands described herein used during the generation of a tabular model.

Event studio 108 may also comprise one or more interactive interfaces for presenting a tabular model in a software package, such as a business intelligence package or software, for enabling a user to visualize transaction data across various dimensions. Computing device 102 may also be configured to store, in a suitable storage device implemented in computing device 106, a generated tabular model. In some examples, the tabular model may comprise an in-memory database stored in one or more RAM devices of computing device 106. Implementations are not limited to such memory devices, however, and may include one or more other suitable memory devices for storing a tabular model. Computing device 106 may comprise a desktop computer, a portable computer, a smartphone, a tablet, or any other processing device. It is noted and understood, however, that computing device 106 may include any number of computing devices. For instance, one or more computing devices may be provided for identifying business events and dependencies, while one or more other computing devices may comprise software packages for presenting data visualizations based on a generated tabular model. An example computing device that may incorporate the functionality of computing device 106 is described below in reference to FIG. 9.

Source system(s) 110 may comprise any number and/or type of systems from which information related to transaction events may be stored. For instance, source system(s) 110 may include systems for storing transaction data 112 related to business events, such as payment information, order information, customer information, products, employee information (e.g., identifiers, salary, etc.), transaction dates or periods, or any other information related to an event or a business's transactions. Source system(s) 110 may comprise a plurality of different types of systems (e.g., based on different platforms, formats/arrangements, storage structures, etc.), and is not limited to any particular type of system. In an example, when a transaction occurs, information related to the transaction may be stored in or across one or more appropriate systems and in some implementations may be linked together with an appropriate identifier (e.g., a key or the like). Any one or more of source system(s) 110 comprise any suitable data structure for storing information and is not limited to any particular implementation or format. For instance, source system(s) 110 may comprise any one or more of a database, spreadsheet, text file, document, etc. or combination thereof.

Although tabular model generation system 104 may be implemented in server 102 and event studio 108 may be implemented in computing device 106 as shown in FIG. 1, it is understood that tabular model generation system 104 and/or event studio 108 may be implemented in or distributed across one or more servers or computing devices as shown in FIG. 1 or any additional servers or computing devices not shown. It is also noted that although computing device 106 is shown in FIG. 1 as being remotely located from server 102, implementations are not so limited. For instance, computing device 106 and server 102 may be co-located, may be implemented on a single computing device, or may be implemented on or distributed across one or more additional computing devices not expressly illustrated in FIG. 1. Similarly, transaction data 112 need not be located in a source system as illustrated in FIG. 1 but may be located and/or distributed across one or more other devices, such as server 102, computing device 106, and/or other servers or devices not shown (e.g., on a cloud-based storage).

Figure 2:
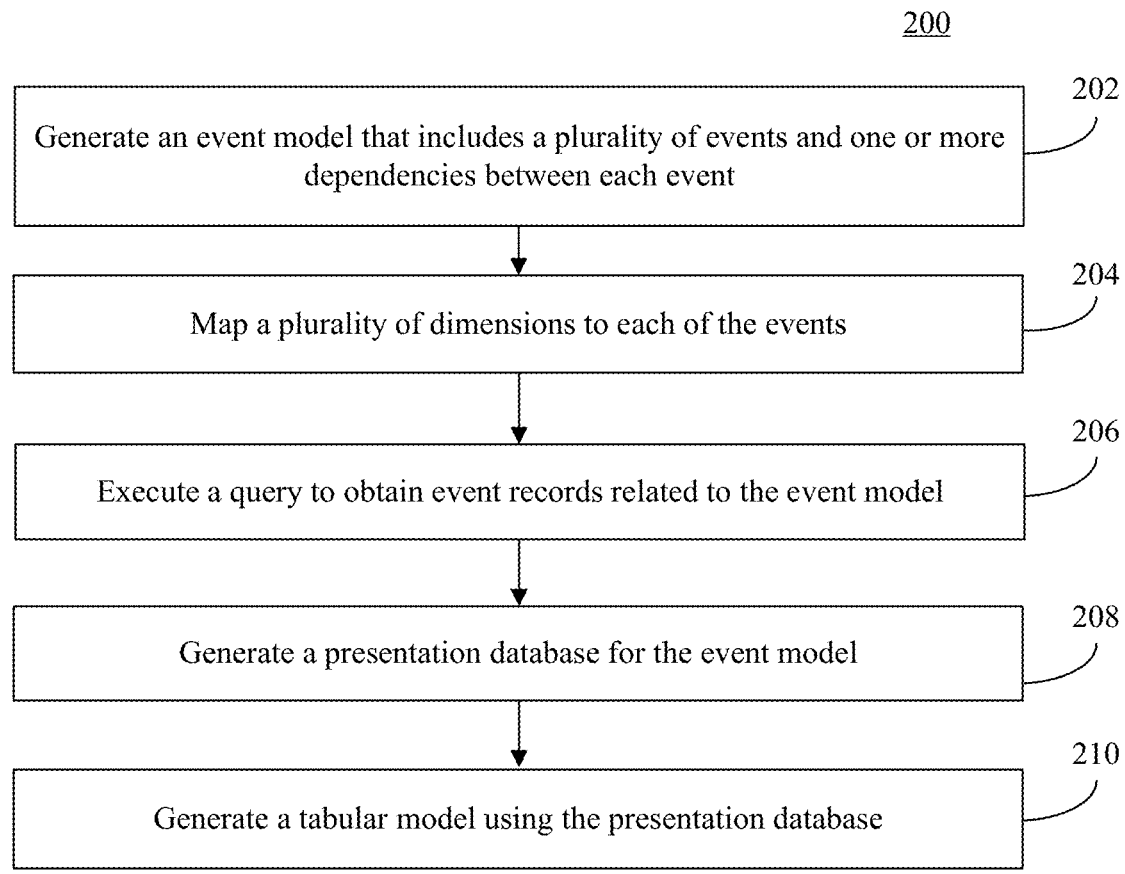
FIG. 2 shows a flowchart of a method for generating a tabular model, according to an example embodiment.
Figure 3:
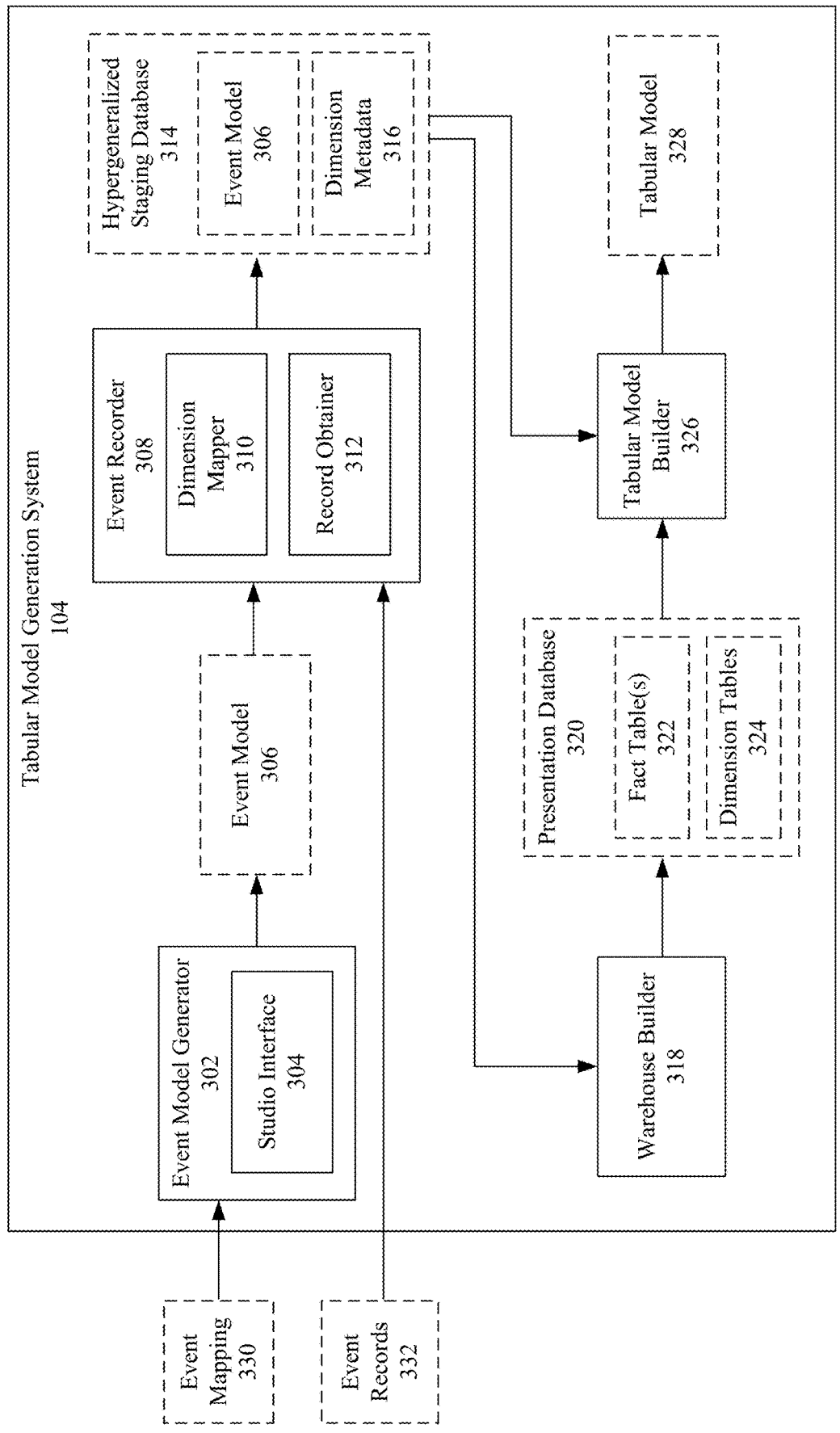
FIG. 3 shows a block diagram of a tabular model generation system, according to an example embodiment.

Tabular model generation system 104 may operate in various ways to generate a tabular model. For instance, tabular model generation system 104 may operate according to FIG. 2. FIG. 2 shows a flowchart 200 of a method for generating a tabular model, according to an example embodiment. For illustrative purposes, flowchart 200 and tabular model generation system 104 are described as follows with respect to FIG. 3. FIG. 3 shows a block diagram of a tabular model generation system 300, according to an example embodiment. As shown in FIG. 3, system 300 includes tabular model generation system 104. Tabular model generation system 104 includes an event model generator 302, an event recorder 308, a warehouse builder 318, and a tabular model builder 326. Event model generator 302 includes a studio interface 304 and may be configured to obtain an event mapping 330 and generate an event model 306 that is stored in hypergeneralized staging database 314.

Event recorder 308 comprises a dimension mapper 310 and a record obtainer 312. Event recorder 308 may obtain a plurality of event records 322 relating to event model 306 to first update hypergeneralized staging database 314 with dimension metadata 316 and then store associated dimension records along with their relationship to event records. As shown in FIG. 1, warehouse builder 318 may generate a presentation database 320 that includes one or more fact table(s) 322 and a plurality of dimension tables 324. Tabular model builder 326 may generate a tabular model 328 in accordance with implementations described herein. Flowchart 200 and system 300 are described in further detail as follows.

Flowchart 200 of FIG. 2 begins with step 202. In step 202, an event model that includes a plurality of events and one or more dependencies between each event is generated. For instance, with reference to FIG. 3, event model generator 302 may be configured to generate event model 306 that includes a plurality of events and one or more dependencies between each event. In implementations, event model 306 may comprise a business event model that includes a plurality of business events (e.g., sales, transactions, milestones, etc.) associated with a business, along with respective dependencies between each business event.

Event model generator 302 may generate event model 306 in various ways. In one example, event model generator 302 may obtain event mapping 330 that identifies events and event dependencies. For instance, studio interface 304 may be configured to interface or communicate with a business intelligence platform or other interface executing on a client computer, such as event studio 108 to obtain event mapping 330 that comprises a user-specified set of business events and dependencies. In some example embodiments, a developer or analyst may interact with event studio 108 to identify business events, event dependencies, and register or identify one or more upstream data sources containing business event records from which data will be retrieved, and/or write one or more SQL queries retrieve business event records from such data sources.

Accordingly, in some implementation, event mapping 330 may comprise a timeline or sequence of one or more interrelated and/or independent events occurring in an environment, such as events or transactions in a business environment. Based on event mapping 330, which may be identified through event studio 108 as described herein, event model generator 302 may generate event model 306 that models the business environment. In some implementations, event model 306 may be stored in in hypergeneralized database 314, as described below. In one illustrative example, event mapping 330 may identify a sequence of events beginning with an accrual of funds, followed by a submission of a marketing plan, review of a marketing plan, submission of a claim, review of a claim, calculation of a payment date, approval of a disbursement, and release of a payment. In this example, event mapping 330 may also identify dependencies between one or more of the events, such as a review of a marketing plan may occur only after a submission of a marketing plan.

Furthermore, each such event may create one or more dimension values and/or reference previously created dimension values. In the above illustration, the aforementioned business events may create and/or reference dimension values, such as company identifiers, account numbers, incentive programs, accrual periods, usage periods, marketing plans, claim numbers, proofs of execution, accrual identifiers, disbursement identifiers, clearing document identifiers, etc. This example, however, is not intended to be limiting, and is provided only for illustrative purposes. Example embodiments described herein may be implemented in any type of environment (business or non-business environments) comprising sequences of interrelated and/or independent events that may create and/or reference various dimension values.

In implementations, each event in event model 306 may be associated with a SQL query comprising one or more SQL commands. For instance, for each of the business events identified in the above illustrative example, a separate SQL query may be written. In examples, the SQL query comprising one or more SQL commands may be configured to define one or more dimensions and/or measures of the event. For instance, the SQL query for a given event may comprise information corresponding to the dimensions and/or measures referred by the event. It is noted and understood, however, that although examples are described herein as comprising SQL queries with one or more SQL commands, implementations are not so limited, and may comprise any other type of code or command that may be used to access transactional data from a database or any other storage system.

Dependencies between events may identify any relationship between one or more other events, if such a relationship exists. For instance, a business event may be an independent or discrete event (e.g., not related to other events), an initiating event, an evolving event (e.g., an event with one or more subsequent events), a recurring event, a milestone event (e.g., an event occurring after another event that may represent a completion of a significant milestone in the evolving event), or any other type of event. Event dependencies in some examples may be associated with a sequence number or the like that may identify the relative order in an overall set of events. Such dependencies between events may be indicated using studio interface 304. As a result of identifying such dependencies, business questions based on event relationships may be easily answered, such as a time since a particular event was triggered, which events are outstanding, etc.

In addition to identifying the events and dependencies between each event, studio interface 304 may be used to identify one or more data sources from which data relating to the event may be retrieved. For instance, identification of the data source may include a server name, a database name, a source timeout, etc., or any other identifying information to register data sources from which information is to be retrieved. In some examples, a given event may comprise multiple SQL queries, with each query configured to pull data from a different data sources (e.g., a product database, a payment database, etc.).

In step 204, a plurality of dimensions is mapped to each of the events (e.g., business events). For instance, with reference to FIG. 3, dimension mapper 310 may decode the dimension information from the SQL query associated with the event and uses it to map a plurality of dimensions to each of the identified events. As discussed above, each event may reference or create one or more dimension values, such as company identifiers, account numbers, incentive programs, accrual periods, usage periods, marketing plans, claim numbers, proofs of execution, accrual identifiers, disbursement identifiers, clearing document identifiers, etc. Such dimensions may be identified as part of the SQL query for a given event, by including in the SQL query one or more parameters associated with each of the dimensions. For instance, for a given event, a SQL query may identify a dimension group, a dimension name, a dimension attribute name, one or more attribute tags, a usage context (e.g., create or read only), a record state flag, or any other attributes. As a result, the various dimensions that are referenced and/or created by each event may be mapped prior to the retrieval of transactional data (e.g., event records) for such an event.

For instance, after parsing queries corresponding to each event, dimension mapper 310 may automatically determine how different dimensions may be related to each other. For each of the dimensions, dimension mapper 310 may update a schema configured to store the dimension along with one or more dimension attributes related to the dimension. In one implementation, dimension mapper 310 may be configured to store each of the dimensions and dimension attributes into a table of hypergeneralized staging database 314.

Therefore, dimension mapper 310 may automatically generate a dimension map that identifies how each event is related to each of the dimensions by parsing each event query. In other words, dimension mapper 310 may store, through an ordering or sequence of events, or in any other suitable manner, an indication of which dimensions may be created and/or referenced when each type of business event occurs in hypergeneralized staging database 314.

Furthermore, dimension mapper 310 may also be configured to store, in hypergeneralized staging database 314, metadata associated with each of the business events. For instance, dimension mapper 310 may store dimension metadata 316 that indicates information about each dimension in a particular arrangement, such as using a predetermined encoding format of information contained within column headers (e.g., the top row) of a table. In one illustrative example, column headers comprising dimension metadata 316 may be encoded according to a certain format that identifies each of a plurality of fields or identifiers associated with a dimension created or referenced by a certain event, such as {Dimension Group}—{Dimension Name}-{Dimension Attribute Name}—{Dimension Attribute Tag}—{Usage Context}-{Records State Flag}. It is noted that such an encoding format is illustrative only, and implementations may include any other manner of arranging and/or storing dimension metadata 316.

In this manner, when the SQL query is executed at runtime, data may be retrieved in a particular fashion as defined by the SQL query and mapped to the identified dimensions. In other words, the SQL query, when executed, may enable the data to be placed in a table in a particular or predetermined format (e.g., by identifying dimension attributes as metadata) as determined by the schema of hypergeneralized staging database 314 that will be used during generation of the tabular model. In some example implementations, mapping of the dimensions to events in the SQL query may result in such dimension information (i.e., dimension metadata) being placed in a header of one or more columns when the query is executed. As a result, if new dimension is to be added, removed, or modified, the SQL query for the appropriate events may simply be updated to modify the dimension mapping, rather than manually altering one or more database schemas.

In step 206, a query is executed to obtain event records related to the event model. For instance, with reference to FIG. 3, record obtainer 312 is configured to execute one or more queries associated with each of a plurality of events to obtain event records 332 related to event model 306. Event records 322 may comprise transaction data 112 stored in one or more source system(s) 110 described herein. For example, event records 332 may include financial records, sales records, marketing records, etc., or any other records that may be associated with a business environment. Accordingly, record obtainer 312 may be configured to execute each query associated to retrieve such event records for each of the events.

In implementations, record obtainer 312 may store retrieved event records 332 in hypergeneralized staging database 314 in a particular or predetermined format, such as based on the schema generated for hypergeneralized staging database 314. For instance, record obtainer 312 may store obtained event records for a particular event (e.g., obtained by executing the SQL query for that event) in such a way that the event occurrence data (event id, timestamp, etc.) are held in a single table, while the dimension records and event record to dimension mapping are stored in one or more simple key-value type lookup tables in hypergeneralized staging database 314.

As discussed above, in some example embodiments, hypergeneralized staging database 314 may also be configured to store dimension metadata 316 for each event. For instance, dimension metadata 316, which may be identified in the SQL query for the event as described above, may be stored in one or more tables of hypergeneralized staging database 314. Other implementations for storing dimension metadata 316 are also contemplated, such as storing dimension metadata as XML or JSON strings in hypergeneralized staging database 314. In this manner, if the mapping of dimensions related to a particular event is to be modified, updating the SQL query to reflect the desired change may automatically cause tables or strings in hypergeneralized staging database 314 to be updated with the modified dimension mapping when record obtainer 312 executes the query. As a result, a schema of one or more databases (e.g., staging databases) need not be manually changed by a user, thus improving the agility at which a staging and/or presentation database may be generated. Furthermore, since each business event may comprise its own SQL query that identifies the dimensions related to the event and may be executed iteratively, separate development teams may work in parallel and optimize work allocations to further increase productivity.

In examples, record obtainer 312 may be configured to load or populate a plurality of tables of hypergeneralized staging database 314 with appropriate event record, dimension information, and measures (as described later). For instance, upon parsing each of the SQL queries associated with the identified events, hypergeneralized staging database 314 may be set up with the appropriate schemas to store dimension records, business event records, and measures. As a result, record obtainer 312, when executing the query, may retrieve data from one or more source systems to automatically populate the appropriate tables in, including but not limited to an event record table, an event record measure table, a dimension record table, a dimension attribute table, and/or any other tables that may be part of hypergeneralized staging database 314.

Accordingly, upon execution of each SQL query, record obtainer 312 may retrieve the appropriate transactional data from the source system(s) identified in the query and place the obtained event records in hypergeneralized staging database 314. Because the schema of the staging database is determined based on the encoded column names in the SQL query, the hypergeneralized staging database may be used in a variety of environments, businesses, and/or industries by customizing the SQL query. As a result, the staging database may be universally implemented. Furthermore, since the hypergeneralized staging database stores the dimension metadata (e.g., in tables, XML, JSON or in any other manner), the staging database may similarly be used across different implementations to generate a tabular model, as described in further detail below. In other words, hypergeneralized staging database 314 may store dimension metadata 316 upon execution of the query that may be used to generate one or more dimension tables used to generate a tabular model. Generation of different types of dimension tables (e.g., for different business environments) may be carried out by customizing the column names in the query to reflect the business intelligence desires of the particular business.

In implementations, event recorder 308 (including dimension mapper 310 and record obtainer 312) may comprise any suitable software instructions and/or execution engine for parsing and/or executing SQL queries described herein. In some example embodiments, event recorder 308 may carry out any of the tasks described through one or more C sharp (also referred to as C #) programming language instructions configured to parse and execute a SQL query against one or more transaction source systems defined in the query. In some other implementations, event recorder 308 may comprise one or more software instructions, in C#or in any other suitable programming language, for generating a dimension map and loading event records in hypergeneralized staging database 314 upon parsing and/or execution of a query, as described herein. It is also contemplated that other manners of parsing and/or executing queries may be used to implement techniques described, as will be appreciated to those skilled in the relevant arts.

In step 208, a presentation database for the event model is generated. For instance, with reference to FIG. 3, warehouse builder 318 may be configured to automatically generate presentation database 320 for event model 306. In examples, presentation database 320 may comprise one or more transformations of information comprised within hypergeneralized staging database 314. In examples, warehouse builder 318 may comprise one or more software instructions (e.g., written in C#or any other suitable programming language) configured to read dimension metadata 316 and event model 306 in hypergeneralized staging database 314. Based on dimension metadata 316 and event model 306, warehouse builder 318 may generate presentation database 320 with the appropriate types and arrangements of tables. For instance, in implementations, warehouse builder 318 may automatically generate one or more fact table(s) 322 associated with a plurality of dimension tables 324 in presentation database 320 that may be used to build a tabular model. Warehouse builder 318 may further be configured to automatically load or populate each generated fact table and dimension table with the appropriate data from hypergeneralized staging database 314.

As used herein, fact table(s) 322 may comprise the center table of a star schema or snowflake schema in a data warehouse. For instance, a fact table may comprise a center table that is surrounded by a plurality of dimension tables. Fact table(s) 322 may comprise transactional data in a number of forms, including but not limited to raw facts and/or measures (e.g., aggregations) of data. Dimension tables 324 may comprise descriptive attributes by which facts in fact table(s) 322 may be analyzed. While dimension tables may contain textual attributes, dimension tables may also contain numerical values (e.g., store identifiers, product codes, etc.). In accordance with techniques, a plurality of dimension tables 324 may be associated with a single fact table. Entries in a dimension table may be associated with entries in a fact table through one or more keys, such as primary keys and/or foreign keys, as appreciated by those skilled in the relevant arts.

In some implementations, warehouse builder 318 may be configured to translate a schema of hypergeneralized staging database 314 into a domain specific database (i.e., presentation database 320) from which a tabular model may be generated. For instance, warehouse builder 318 may read data stores across various tables of hypergeneralized staging database 314, including dimension metadata 316, and generate presentation database 320 that comprises one or more dimension tables (e.g., separate dimension tables for claims, marketing plans, etc.). In other words, by virtue of dimension metadata 316 that includes dependency information, among other things, warehouse builder 318 may automatically query each of the dimensions related to each specific business event and load data retrieved for those events from hypergeneralized staging database 314 into presentation database 320. As a result, by parsing dimension metadata 316, which may be stored as tables in hypergeneralized staging database 314, warehouse builder 318 may execute one or more software instructions to create dimension tables on the fly.

In step 210, a tabular model is generated using the presentation database. For instance, with reference to FIG. 3, tabular model builder 326 may be configured to generate tabular model 328 using presentation database 320 (including one or more of fact tables(s) 322 and a plurality of dimension tables 324) and metadata stored in hypergeneralized database 314. In example implementations, tabular model builder 326 may comprise one or more software instructions (e.g., written in C#or any other suitable programming language) configured to read dimension metadata 316 and event model 306 from hypergeneralized staging database 314 to automatically identify relationships between one or more of fact table(s) 322 and the plurality of dimension tables 324. In some examples, tabular model builder 326 may further be configured to automatically generate a star or snowflake schema in connection with generation of tabular model 328.

Tabular model builder 326 may also be configured to execute one or more data refresh queries with one or more table partitions of tabular model 328. For instance, tabular model builder 326 may implement one or more extraction, transformation, and loading (ETL) techniques to refresh data in tabular model 328 to ensure that the data stored therein is up to date. Tabular model builder 326 may execute such refresh queries automatically, or may execute such queries manually (e.g., in response to a user-initiated event, such as interaction with a GUI element in a BI package).

It is also noted that although tabular model builder 326 may be implemented in tabular model generation system 104 as shown in FIG. 3, tabular model builder 326 may be implemented in, or distributed across, one or more other systems or services not expressly shown. For instance, tabular model builder 326 may be configured to generate tabular model 328 through one or more other systems or services through a suitable API or the like.

In implementations, tabular model 328 may be loaded or populated with the appropriate data and deployed to an appropriate analysis service, such as SSAS (SQL Server Analysis Services) or other software packages for BI solutions, such as Microsoft® Azure Analysis Services, Microsoft® Power BI, or other software packages such as Microsoft® Power View or Microsoft® Excel. In some other implementations, tabular model 328 may also be stored in memory, such as RAM or other suitable storage device, where the model may be accessed to perform data analyses.

In this manner, tabular model builder 326 may generate tabular model 328 using a generalized database that may be universally implemented for various domains or industries (e.g., retail, telecommunications, consulting, etc. or any other non-business domain). In other words, by identifying business events and their dependencies, along with interrelationships with one or more dimensions, hypergeneralized staging database 314 may be designed in such a way that it can be used to model a wide spectrum of business events and enable analysts to use tabular model generation system 104 to generate a robust and adaptable tabular model. As a result, manual creation of tables and databases (e.g., dimension tables) may be reduced or even avoided altogether. Rather, by defining events through event studio 108, a domain specific database may be automatically generated and populated from the appropriate data sources based on event model 306.

In implementations, the process through which a developer or analyst desires to modify tabular model 328 with a change request may also be streamlined using techniques described herein. For instance, where a new field is to be added to tabular model 328, one or more SQL queries may be modified through event studio 108 to identify or register the new upstream data source from which to obtain the new field. Event recorder 308 may be configured to execute the SQL query for one or more of the identified business events, which causes hypergeneralized staging database 314 to include updated dimension metadata 316 that comprises the new field. Event recorder 308 may further be configured to populate hypergeneralized staging database 314 with the appropriate data values for the newly added field based on the identified data source. Warehouse builder 318 may be executed to regenerate fact table(s) 322 and dimension tables 324 as described herein such that the newly added field appears as a column in the appropriate dimension table(s). Upon generation of the updated fact and dimension tables, tabular model builder 326 may regenerate tabular model 328 with the updated field and deploy the model to the desired BI package and/or store the tabular model in memory. In this manner, manual effort to modify a tabular model may be reduced, enabling the tabular model to be updated more efficiently.

Figure 4:
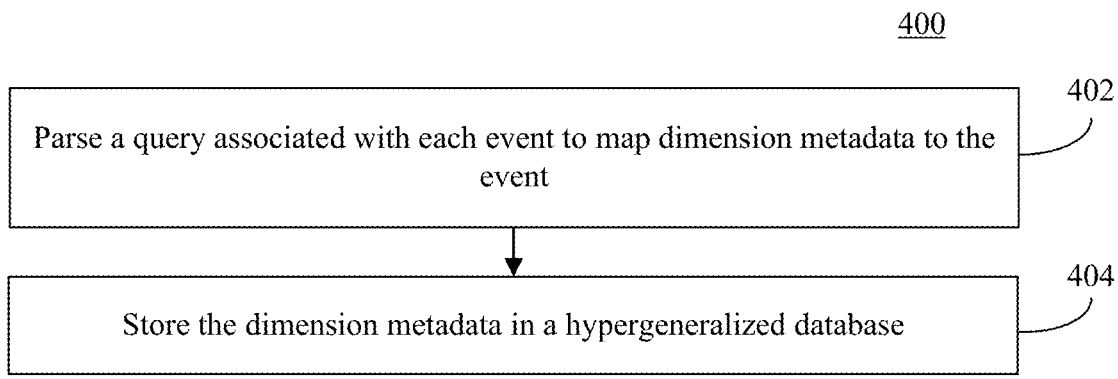
FIG. 4 shows flowchart of a method for storing dimension metadata in a hypergeneralized database, according to an example embodiment.

Event recorder 308 may operate in various ways to store a mapping of dimension metadata to an event. For example, FIG. 4 shows a flowchart 400 of a method for storing dimension metadata in a hypergeneralized database, according to an example embodiment. In an implementation, the method of flowchart 400 may be implemented by event recorder 308. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, a query associated with each event is parsed to map dimension metadata to the event. For instance, with reference to FIG. 3, dimension mapper 310 may be configured to parse each SQL query associated with each event of event model 306 to map dimension metadata to the event. As described above, each event may be associated with a particular query that identifies, among other things, a plurality of dimension parameters associated with the event. For example, the query may be parsed to identify a dimension group, a dimension name, a dimension attribute name, one or more attribute tags, a usage context, a record state flag, or any other attributes related to dimensions associated with the event.

Thus, in examples, dimension and dimension attribute metadata may be included as part of SQL query in a manner such that results of the query (when executed) automatically encode event records with the metadata. In some illustrative examples, upon retrieval of event records, the column names or column headers may be encoded with dimension metadata by identifying the dimension information in a particular encoding format (e.g., {Dimension Group}—{Dimension Name}—{Dimension Attribute Name}—{Dimension Attribute Tag}—{Usage Context}—{Records State Flag}). In this manner, each event record, which may be identified by a time stamp and/or key value, may be automatically mapped to a plurality of dimensions based on the column header information.

In step 404, the dimension metadata is stored in a hypergeneralized database. For instance, with reference to FIG. 3, dimension mapper 310 may store dimension attribute information in hypergeneralized staging database 314 as described above. In some examples, dimension mapper 310 may be configured to generate a database schema that associates each event with a dimension and dimension attribute as dimension metadata 316. In some further implementations, dimension mapper 310 may also automatically create a schema, based on the encoded information in the query, to store dimensions and related dimension attributes in hypergeneralized staging database 314. For example, as described above, upon execution of the query for each event, dimension metadata 316 may be stored in hypergeneralized staging database 314 along with event records 332 retrieved from the source systems identified in the query. In this manner, hypergeneralized staging database 314, combined with dimension metadata 316 (e.g., in tables, XML, JSON or in any other manner) may be populated in a manner that automatically associates each of the events with one or more dimensions.

Figure 5:
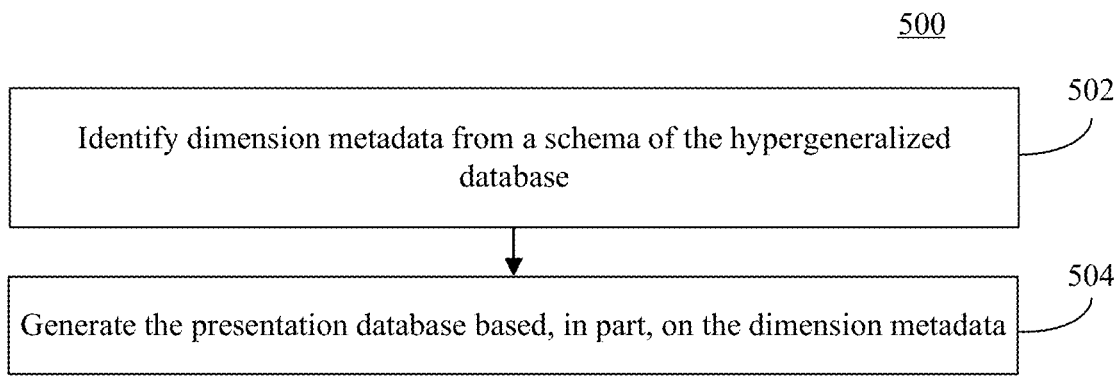
FIG. 5 shows a flowchart of a method for generating a presentation database based, in part, on dimension metadata, according to an example embodiment.

As described above, presentation database 320 may be generated from hypergeneralized staging database 314. For example, FIG. 5 shows a flowchart 500 of a method for generating a presentation database based, in part, on dimension metadata, according to an example embodiment. In an implementation, the method of flowchart 500 may be implemented by warehouse builder 318. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, dimension metadata is identified from a schema of the hypergeneralized database. For instance, with reference to FIG. 3, dimension metadata 316 may be included in a schema of hypergeneralized staging database 314, as described above. Warehouse builder 318 may be configured to obtain dimension metadata 316 that may identify, among other things, a mapping of dimensions and dimension attributes to each business event. For example, such dimension metadata may be stored in tables of hypergeneralized staging database 314 for each event type.

It is noted and understood, however, that each event may be associated with a plurality of dimensions. For instance, dimension metadata 316 may comprise a plurality of rows in a table, each of which identify a different dimension that is associated with a particular event. In this manner, by obtaining dimension metadata 316 from hypergeneralized staging database 314, warehouse builder 318 may automatically identify the relationships and associations between events and dimensions.

In step 504, the presentation database is generated, in part, based on the dimension metadata. For instance, with continued reference to FIG. 3, warehouse builder 318 may be configured to generate dimension tables in presentation database 320 based on dimension metadata 316. In implementations, warehouse builder 318 may be configured to generate a plurality of dimension tables 324 based on dimension metadata 316 and load such tables with the appropriate data from hypergeneralized staging database 314. For example, because dimension metadata 316 identifies the various dimensions that are to be included in the tabular model and their relationships to business events, warehouse builder 318 may automatically set up the appropriate dimension tables and load the tables with the requisite data. Similarly, by virtue of identifying the dependency of events in event model 306 and the relationships of each event to the various dimensions, warehouse builder 318 may be configured to generate one or more fact table(s) 322 on the fly.

Figure 6:
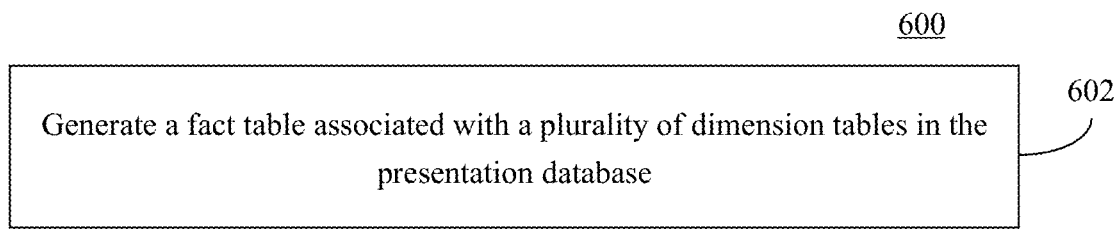
FIG. 6 shows a flowchart of a method for generating a fact table associated with dimension tables in a presentation database, according to an example embodiment.

Fact and dimension tables may be generated in various ways in example implementations. For instance, FIG. 6 shows a method of a flowchart for generating a fact table associated with dimension tables in a presentation database, according to an example embodiment. In an implementation, the method of flowchart 600 may be implemented by warehouse builder 318. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, a fact table associated with a plurality of dimension tables in the presentation database are generated. For instance, with reference to FIG. 3, warehouse builder 318 may be configured to generate one or more fact table(s) 322 and associate it with a plurality of dimension tables in presentation database 320 as described above. In implementations, warehouse builder 318 may be configured to generate fact and dimension tables automatically and/or on the fly based, at least in part, on dimension metadata 316 and event model 306, which may identify relationships between events and dimensions.

In some example embodiments, fact tables may be generated on the fly by executing dynamic queries associated with each type of event (e.g., instructions for initiating events, instructions for evolving events, etc.) based on a mapping of business events and dimensions, as discussed above. For instance, warehouse builder 318 may execute a set of instructions to combine various entries in hypergeneralized staging database 314. As noted earlier, hypergeneralized staging database 314 may be loaded with event records and dimension records, among other things. In one example, warehouse builder 318 may comprise instructions to perform a LEFT JOIN (or OUTER JOIN) on such entries. A LEFT JOIN, when executed, may cause warehouse builder to retrieve records from two separate tables of hypergeneralized staging database 314. For instance, a LEFT JOIN command may be executed to join events and dimensions to generate a fact table on the fly. As a result, a fact table may be generated that comprises a combination of events and dimensions that are referenced and/or created. Implementations are not limited to generating a fact table using a LEFT JOIN, but may include any other JOIN commands or other techniques for combining values stored in hypergeneralized staging database 314.

Using such associated fact tables and dimension tables generated in a manner as described above, tabular model builder 326 may automatically generate a star or snowflake schema at runtime with the fact table at the center appropriately linked to each of a plurality of dimension tables in a manner as appreciated by those skilled in the art (e.g., by linking primary and foreign keys).

In some further example embodiments, one or more of fact table(s) 322 may comprise a measure that is defined in a query associated with an event. Measures may include any aggregation, summation, or combination of facts (e.g., sales for a given month, quarter, year, etc.). In some other examples, measures may comprise time intervals between various events, such as a processing time between a claim submittal and final processing of the claim. For instance, time intervals may be determined based on the event dependencies defined in event studio 108 and stored in event model 306 of hypergeneralized database 314. Such event dependencies may enable one or more events to be linked together via a sequence number or key, if such a dependency exits. Since the dependency information between events is known, measures comprising desired intervals between events, or measures indicating that certain events have not yet occurred (e.g., a claim has not been processed even though a claim was submitted), may be automatically included when the fact table is generated. Measures are not limited to such illustrative examples, however, and may include any other analysis of that may be beneficial to analyze across one or more dimensions or events.

In examples, measures may be defined in one or more SQL queries associated with a business event. For instance, a developer or analyst may determine that certain measures may be desirable to analyze for a given event, and accordingly may define such measures in the SQL query associated with that event. In this manner, if measures are to be added, removed, and/or modified, the developer or analyst may revise the query for the event, rather than engaging in a complex and time-consuming process of defining measures in other manners.

Figure 7:
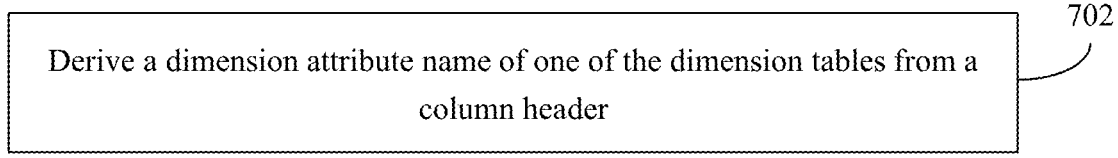
FIG. 7 shows a flowchart of a method for deriving a dimension attribute name, according to an example embodiment.

In some example implementations, dimension attribute information may be extracted from dimension metadata 316 of hypergeneralized staging database 314. For example, FIG. 7 shows a flowchart 700 of a method for deriving a dimension attribute name, according to an example embodiment. In an implementation, the method of flowchart 700 may be implemented by dimension mapper 310. FIG. 7 is described with continued reference to FIG. 3. Other structural and operational implementations will be apparent to persons skilled in the relevant art(s) based on the following discussion regarding flowchart 700 and system 300 of FIG. 3.

Flowchart 700 begins with step 702. In step 702, a dimension attribute name of one of the dimension tables is derived from a column header. For instance, with reference to FIG. 3, hypergeneralized staging database 314 may comprise dimension metadata 316 as described earlier. Dimension metadata 316 may comprise metadata that links events and dimensions in various ways. In example implementations, dimension metadata 316 may comprise metadata that is encoded into a column header of the SQL query associated with the event and stored in hypergeneralized staging database 314 when results from a query associated with an event are loaded into the database.

In an illustrative example described earlier, a column header may be encoded in a predetermined format, such as by identifying one or more dimension-related fields. For instance, the column header may be encoded in a non-limiting manner as follows: {Dimension Group}—{Dimension Name}—{Dimension Attribute Name}—{Dimension Attribute Tag}—{Usage Context}—{Records State Flag}, where each field comprises the appropriate identifier or flag entry. Based on such dimension metadata, therefore, dimension mapper 310 may be configured to automatically identify a dimension attribute name from the column header that may be used when generating a dimension table as described above. In some further implementations, dimension mapper 310 may be further configured to rename or reformat dimension attribute names to one or more user-friendly names, such as by adding a space between words, capitalizing certain letters, fixing punctuation, etc. Tabular model builder 326, may be further configured to show these user-friendly names in tabular model 328, improving the readability and data discoverability of the model. In this manner, the generation of user-friendly dimension tables may be further automated by automatically including the appropriate name of the dimension attribute (or any other identifier that may be present in dimension metadata 316).

III. Illustrative Database Schema Embodiments

As described above, tabular model generation system 104 (and subcomponents included therein) interpret and process domain agnostic event and dimension data stored in hypergeneralized database 314 to autogenerate presentation database 320 and then build tabular model 328. FIGS. 8A-8G depict illustrative database schemas that may be generated in accordance with example embodiments in order to enable event model generator 302, event recorder 308, warehouse builder 318 and tabular model builder 326 to effectively store, interpret and process domain agnostic event and dimension data. It is noted and understood that the examples shown in FIGS. 8A-8G are provided for illustrative purposes and are not intended to be limiting. Each illustrative database schema is described as follows.

Figure 8A:
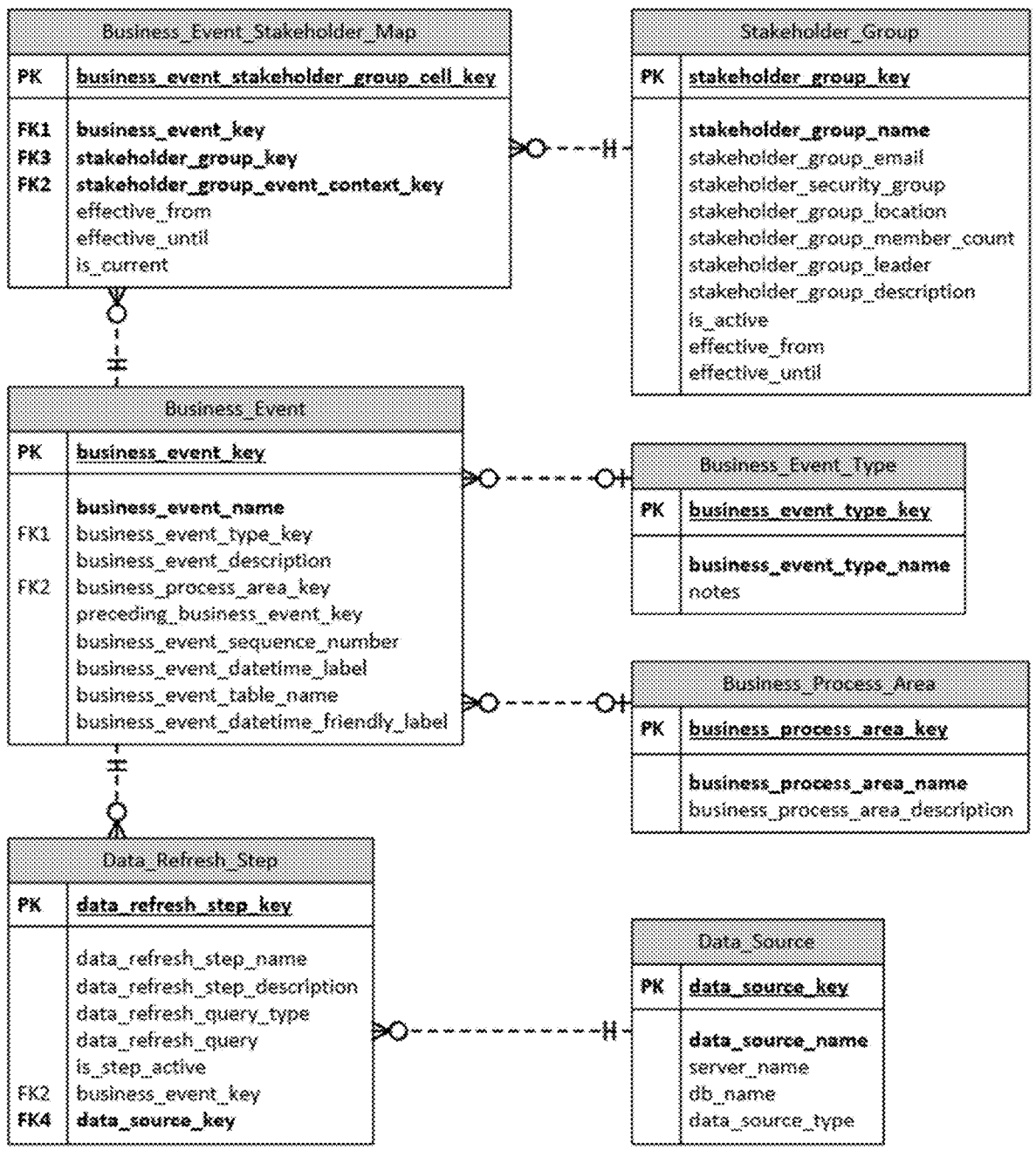
FIGS. 8A-8G show illustrative database schemas that may be generated in accordance with example embodiments.

FIG. 8A shows an example schema 801 for storing business events and queries, according to an example embodiment. For example, the illustrative schema shown in FIG. 8A may be generated in accordance with step 202 of flowchart 200, described above. For instance, event studio 108 and event model generator 302 may be configured to generate event model 306 that comprises example schema 801. In example implementations, example schema 801 (e.g., in event model 306) may be stored in hypergeneralized staging database 314, as described above.

Figure 8B:
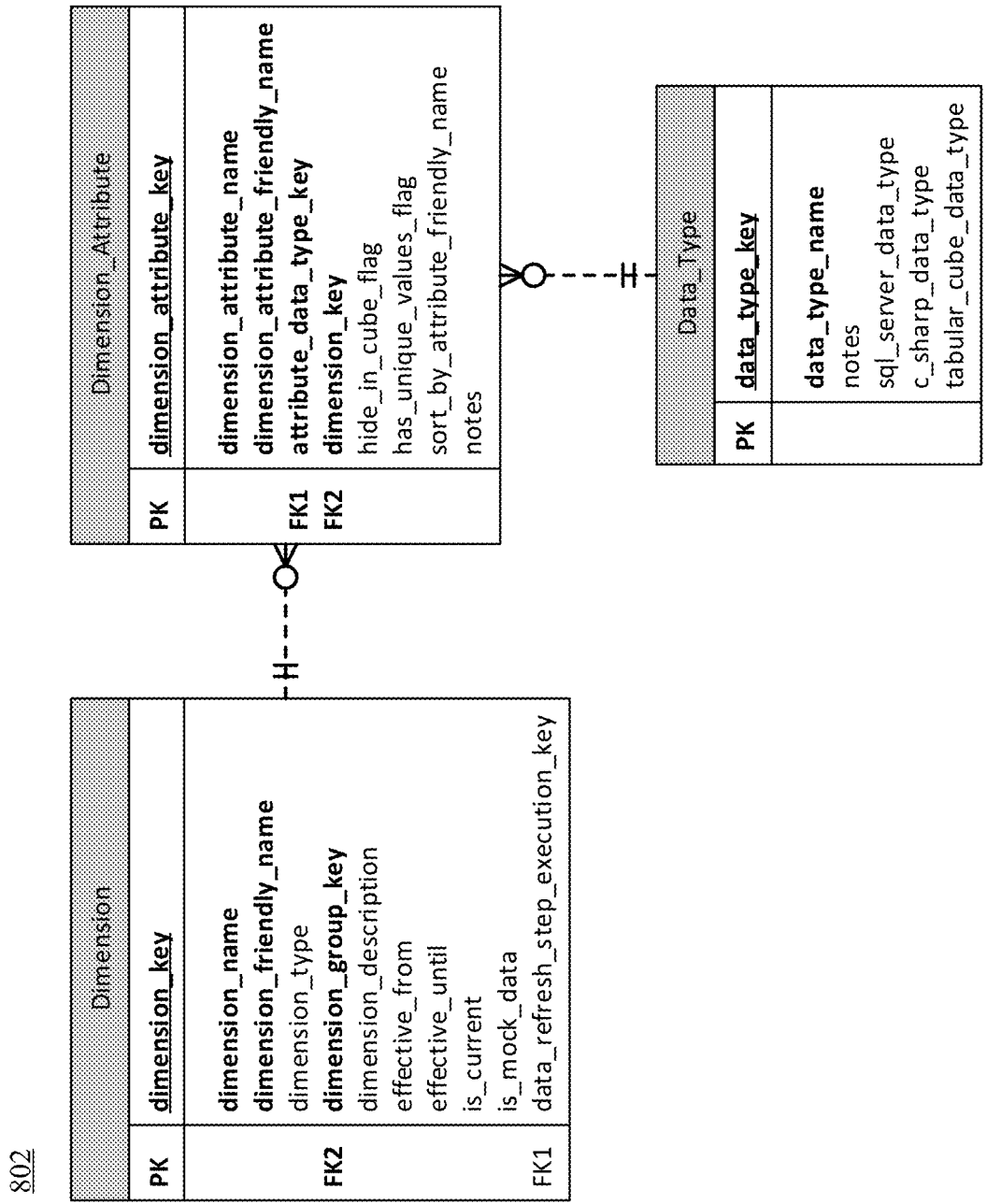

FIG. 8B shows an example schema 802 for storing dimensions and related attributes, according to an example embodiment. For example, the illustrative schema shown in FIG. 8B may be generated in accordance with step 204 of flowchart 200, and/or steps 402 and 404 of flowchart 400, described above. In example implementations, dimension mapper 310 may be configured to parse encoded column names in the query associated with each event, and store each of the dimensions and dimension attributes in hypergeneralized staging database 314 using the illustrative schema shown in FIG. 8B.

Figure 8C:
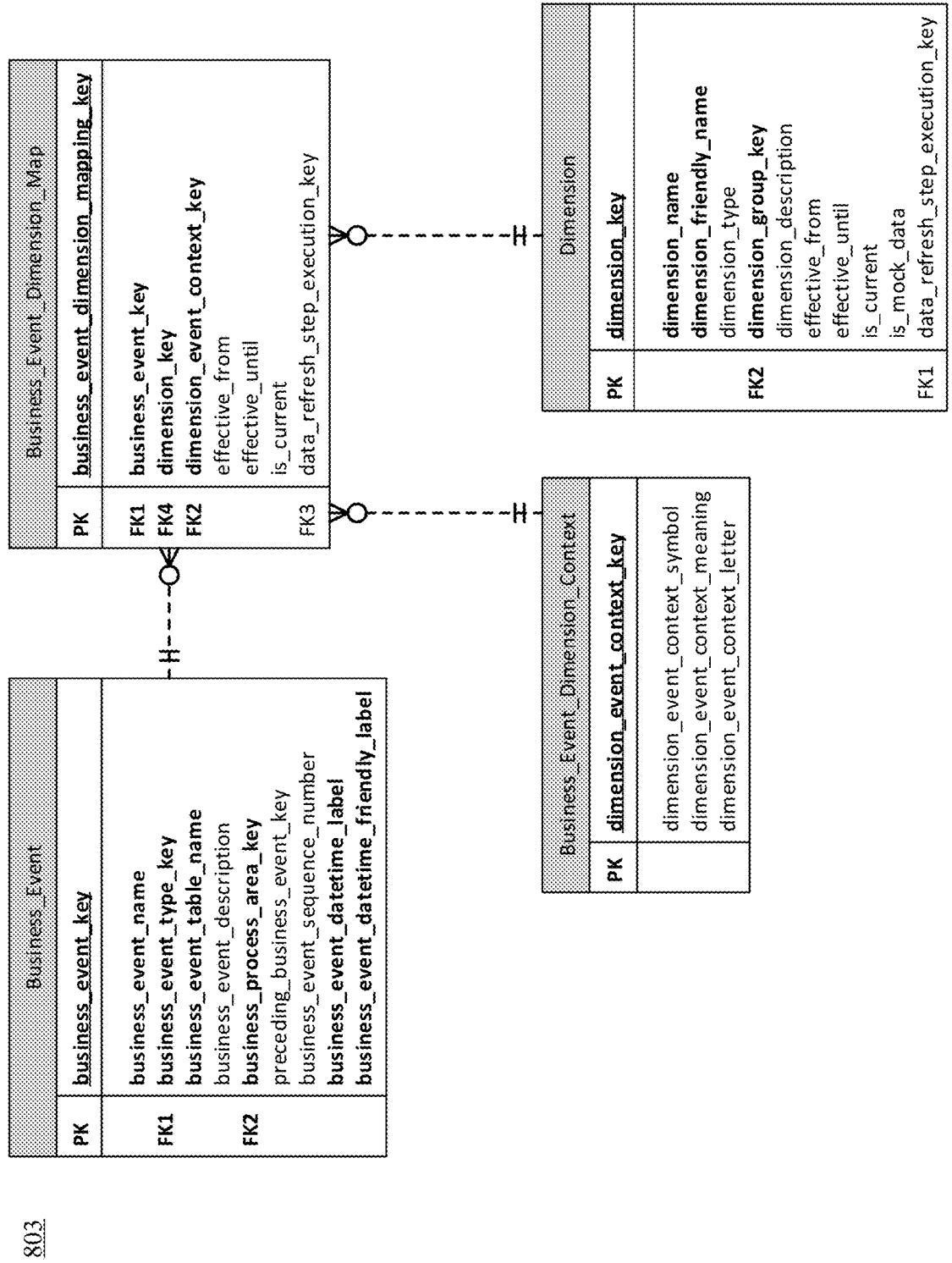

FIG. 8C shows an example schema 803 for storing a mapping of business events to dimensions, according to an example embodiment. For example, the illustrative schema shown in FIG. 8C may be generated in accordance with step 204 of flowchart 200 and/or steps 402 and 404 of flowchart 400, described above. For instance, dimension mapper 310 may be configured to parse encoded column names in the query, for each event, and then store information indicating which dimensions may be created and/or referenced when the event occurs in hypergeneralized staging database 314 using the illustrative schema shown in FIG. 8C.

Figure 8D:
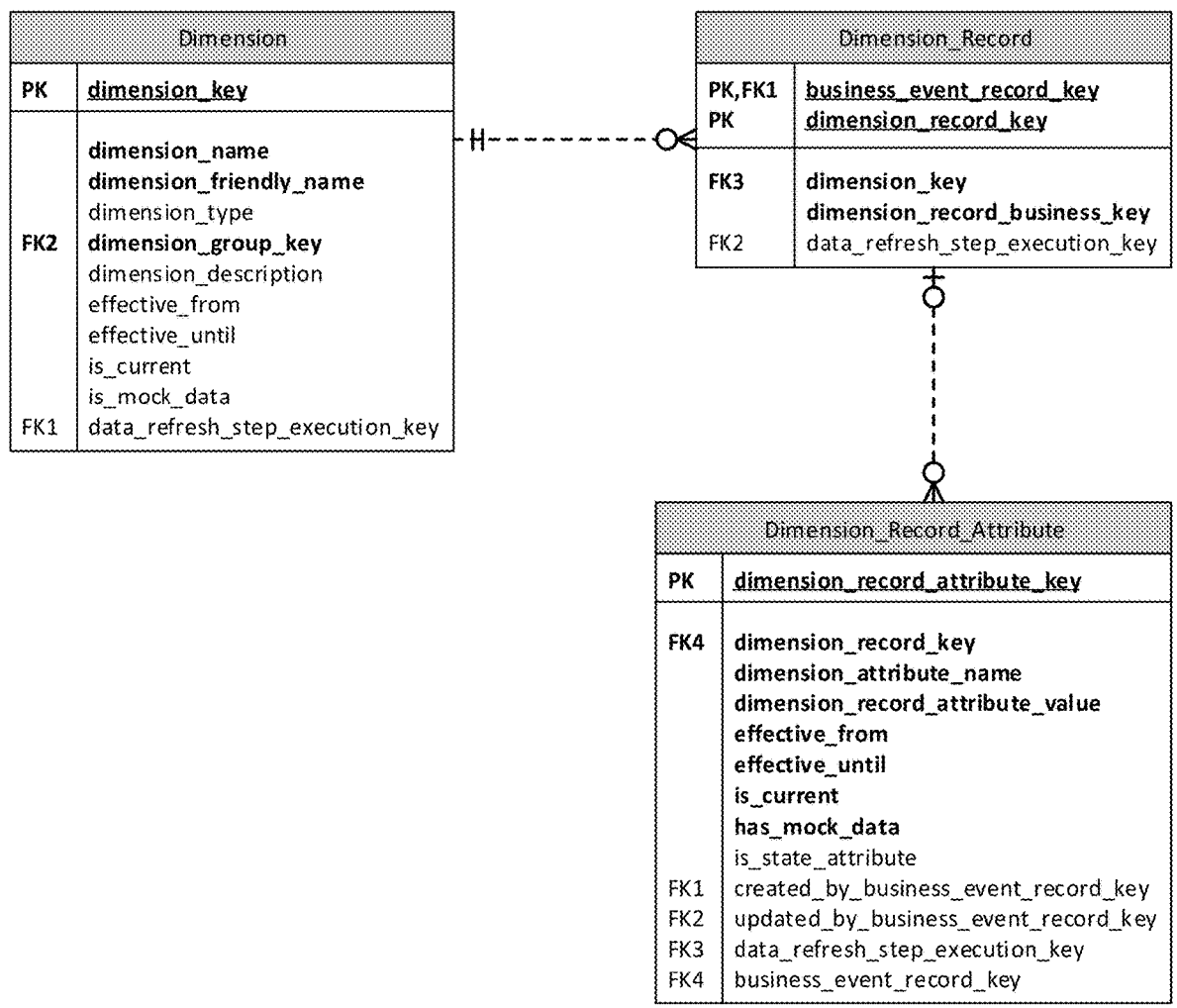

FIG. 8D shows an example schema 804 for storing dimension records, according to an example embodiment. For example, the illustrative schema shown in FIG. 8D may be generated in accordance with step 206 of flowchart 200, described above. In example implementations, record obtainer 312 may be configured to load dimension records and dimension record attributes (e.g., by retrieving transactional data from one or more source system(s) 110) in example schema 804 as shown in FIG. 8D. As described above, example schema 804 may be also be stored in hypergeneralized staging database 314.

Figure 8E:
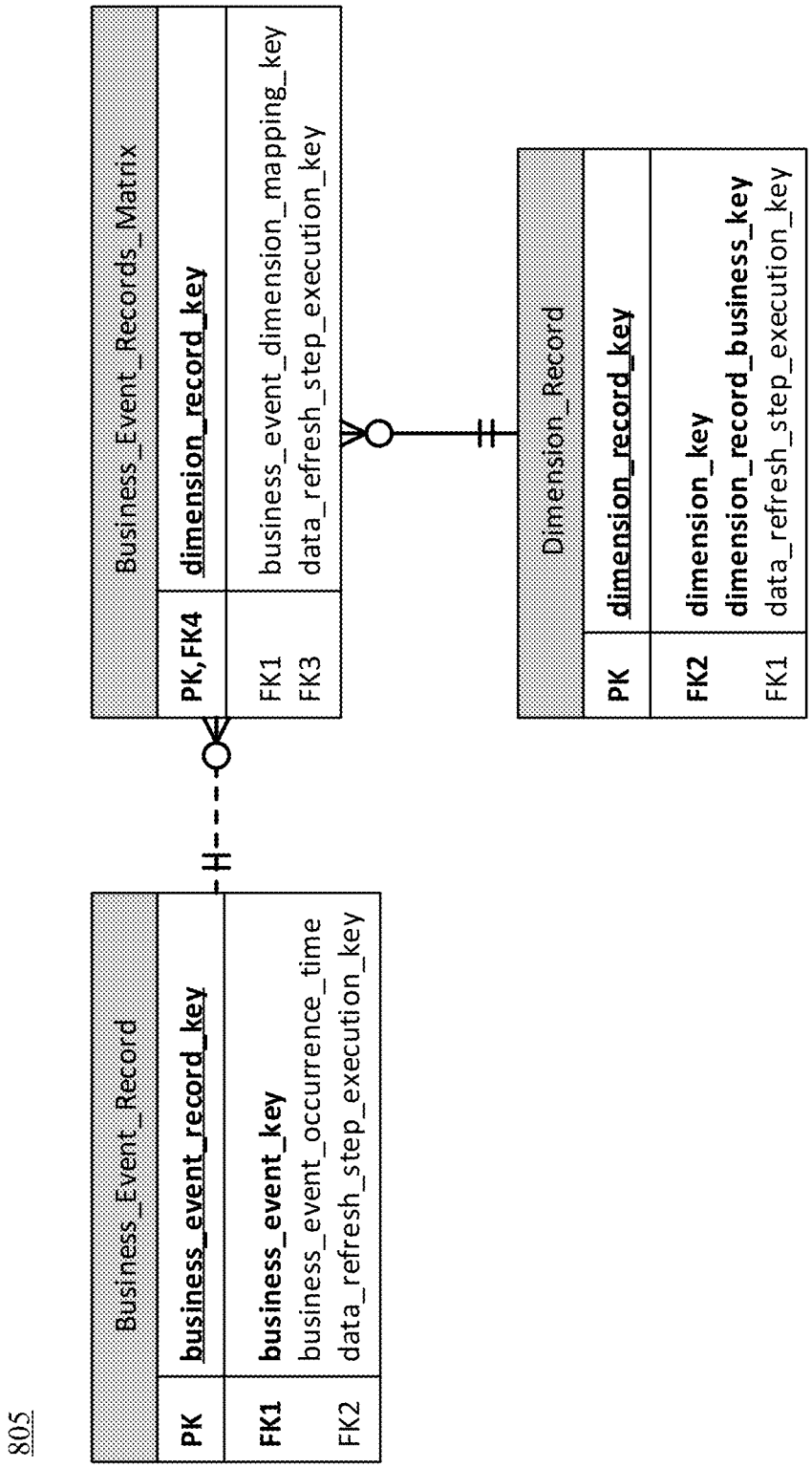

FIG. 8E shows an example schema 805 for storing event records (e.g., business event records), according to an example embodiment. For example, the illustrative schema shown in FIG. 8E may be generated in accordance with step 206 of flowchart 200, described above. In examples, record obtainer 312 may be configured to execute queries associated with each event to fetch transactional event records 332 and then load or populate example schema 805, as shown in FIG. 8E, in such a way that the event occurrence data (e.g., event record key, occurrence time, etc.) are stored in a business event record table, while the event record to dimension record mapping are stored in business event record matrix table.

Figure 8F:
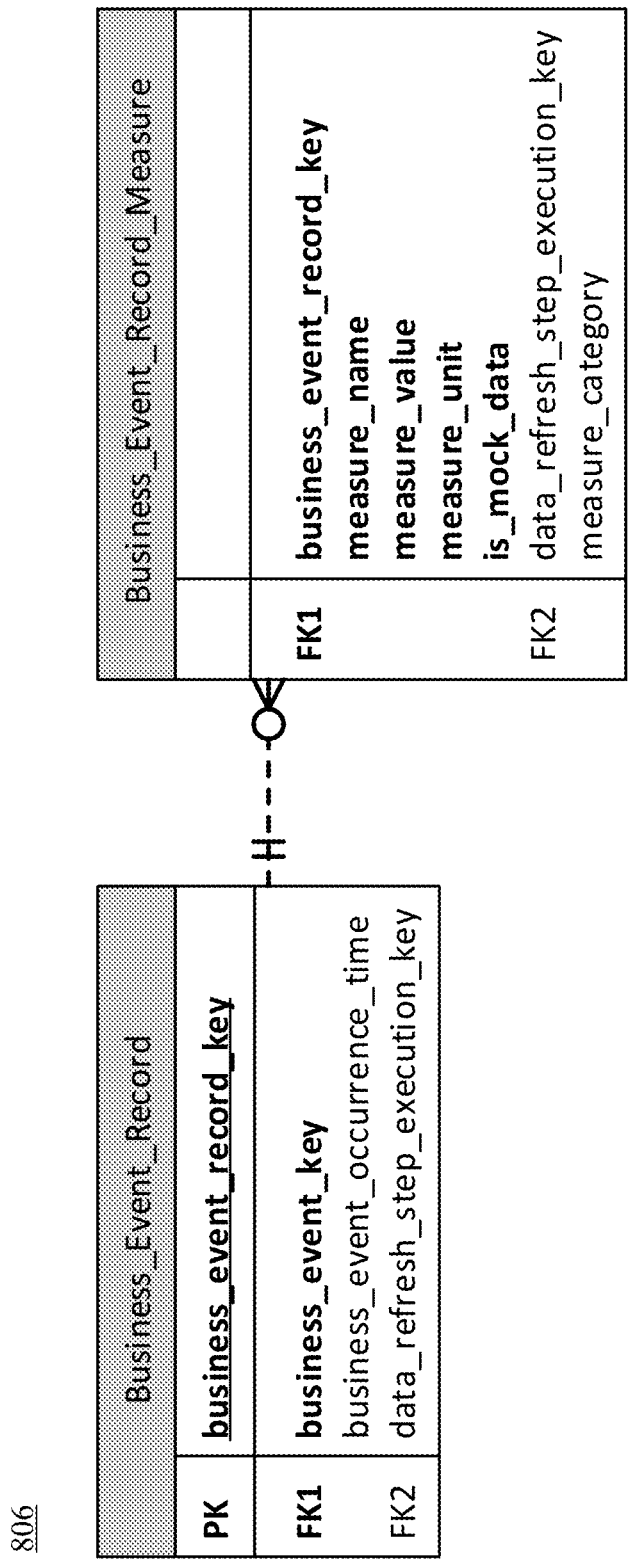

FIG. 8F shows an example schema 806 for storing measures (e.g., business event record measures), according to an example embodiment. For example, the illustrative schema shown in FIG. 8F may be generated in accordance with step 206 of flowchart 200, described above. In examples, record obtainer 312 may be configured to execute queries associated with each event to load or populate example schema 806. As a result, an event record measure table in hypergeneralized staging database 314 may be populated with the appropriate measures (e.g., aggregation, summation, or combination of facts, or time intervals between events, etc.), as defined in each query.

Figure 8G:
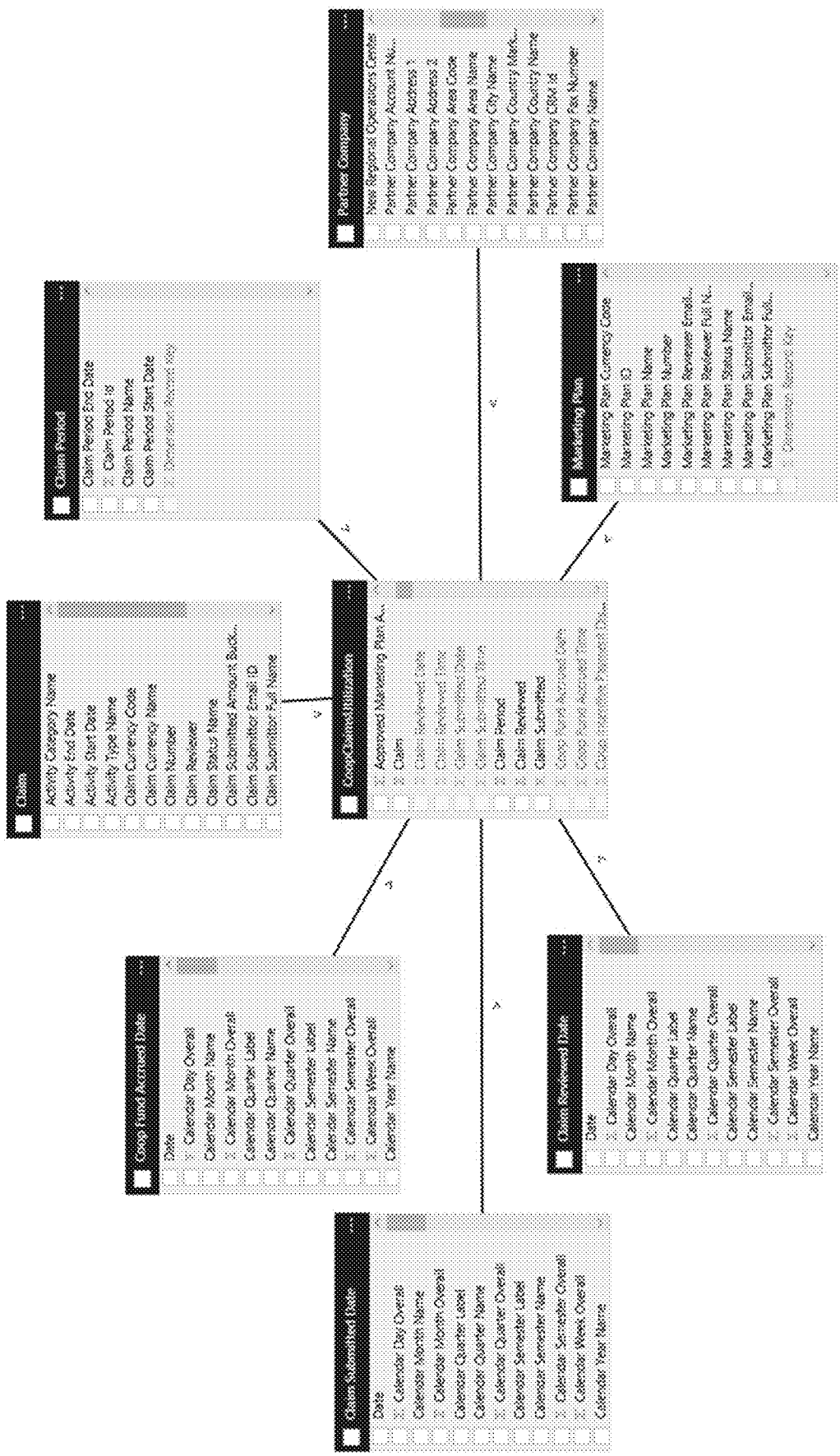

FIG. 8G shows an example star schema 807 that may be automatically generated, according to an example embodiment. For example, the example star schema 807 may be generated in accordance with steps 208 and/or step 210 of flowchart 200, and/or step 602 of flowchart 600, described above. As described above, warehouse builder 318 and tabular model builder 326 may be configured to generate example star schema 807 comprising a fact table and a plurality of dimension tables in examples. For instance, as shown in FIG. 8G, example star schema 807 may comprise a fact table (e.g., fact table 322) at the center, associated with a plurality of dimension tables (e.g., dimension tables 324). Although an example star schema is depicted in FIG. 8G, it is understood that a snowflake schema, or other appropriate schema comprising a fact table associated with a plurality of dimension tables, may be generated in accordance with implementations.

IV. Example Mobile and Stationary Device Embodiments

Server 102, tabular model generation system 104, computing device 106, event studio 108, source system(s) 110 (and/or any subcomponents of any of the same), flowchart 200, flowchart 400, flowchart 500, flowchart 600, and/or flowchart 700 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of server 102, tabular model generation system 104, computing device 106, event studio 108, source system(s) 110 (and/or any subcomponents of any of the same), flowchart 200, flowchart 400, flowchart 500, flowchart 600, and/or flowchart 700 may be implemented separately or together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
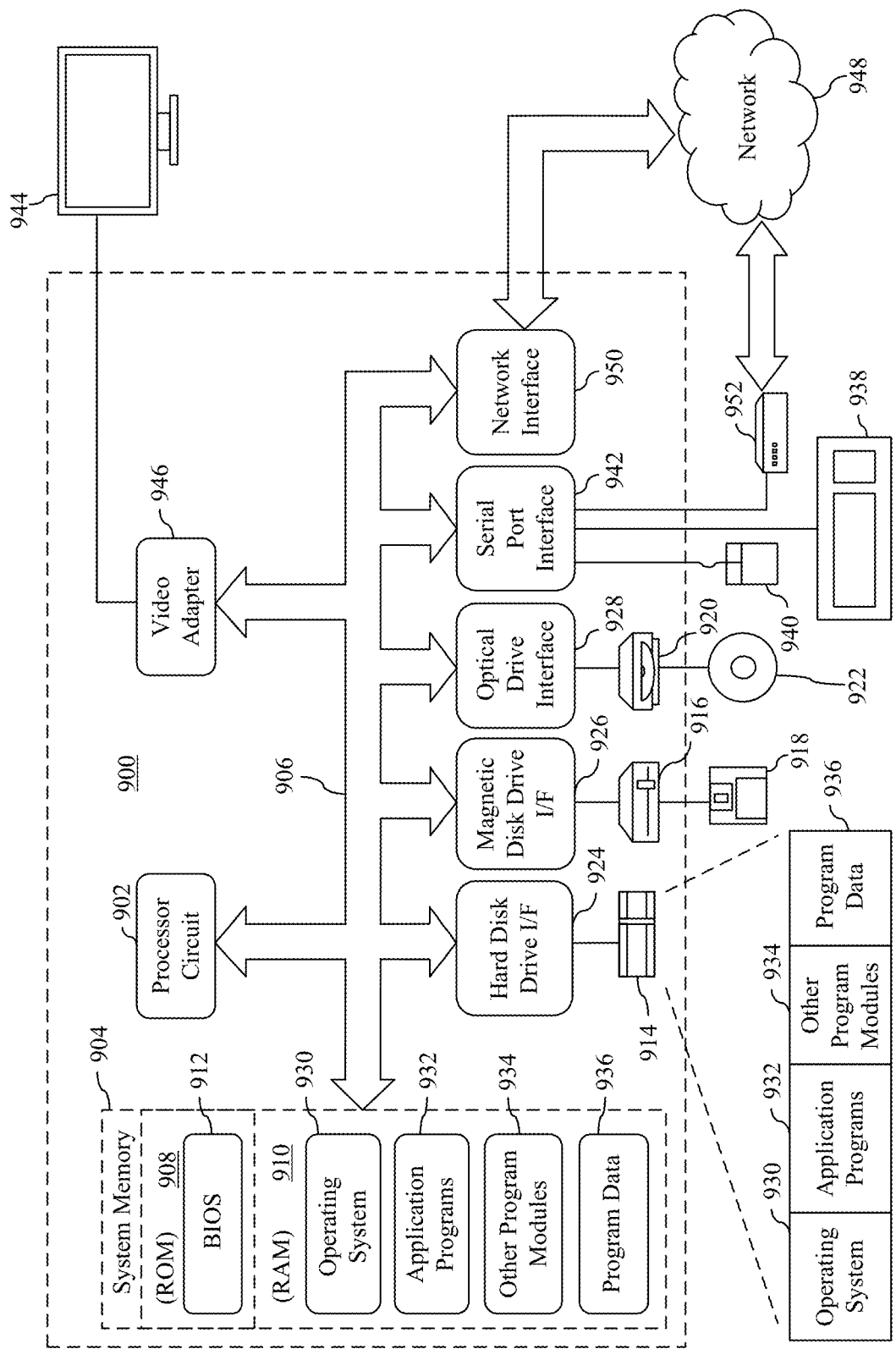
FIG. 9 shows a block diagram of an example computing device that may be used to implement example embodiments.

FIG. 9 depicts an exemplary implementation of a computing device 900 in which example embodiments may be implemented. For example, any of server 102, tabular model generation system 104, computing device 106, event studio 108, source system(s) 110 (and/or any subcomponents of any of the same) may be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Example embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing server 102, tabular model generation system 104, computing device 106, event studio 108, source system(s) 110 (and/or any subcomponents of any of the same), flowchart 200, flowchart 400, flowchart 500, flowchart 600, and/or flowchart 700 (including any suitable step of flowcharts 200, 400, 500, 600, or 700) and/or further example embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of example embodiments described herein. Accordingly, such computer programs represent controllers of the computing device 900.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system for generating a tabular model is described herein. The system includes: one or more processors; one or more memory devices that store program code configured to be executed by the one or more processors, the program code comprising: an event model generator configured to generate an event model that comprises a plurality of events and one or more dependencies between each event; an event recorder configured to: map a plurality of dimensions to each of the events, and execute a query to obtain event records related to the event model; a warehouse builder configured to automatically generate a presentation database for the event model; and a tabular model builder configured to generate a tabular model using the presentation database; and a storage device for storing the tabular model.

In one implementation of the foregoing system, the event recorder is further configured to: parse a query associated with each event to map dimension metadata to the event, and store the dimension metadata in a hypergeneralized database.

In another implementation of the foregoing system, the warehouse builder is configured to: identify dimension metadata from a schema of the hypergeneralized database, and generate the presentation database based, in part, on the dimension metadata.

In another implementation of the foregoing system, the warehouse builder is configured to generate a fact table associated with a plurality of dimension tables in the presentation database.

In another implementation of the foregoing system, the fact table comprises a measure that is defined in a query associated with an event.

In another implementation of the foregoing system, the system further includes a dimension mapper configured to derive a dimension attribute name of one of the dimension tables from a column header.

In another implementation of the foregoing system, the system further includes a GUI configured to receive an identification of the plurality of events and the one or more dependencies between each event.

A method implemented by one or more computing devices for generating a tabular model is disclosed herein. The method includes: generating an event model that comprises a plurality of events and one or more dependencies between each event; mapping a plurality of dimensions to each of the events; executing a query to obtain event records related to the event model; generating a presentation database for the event model; and generating a tabular model using the presentation database.

In one implementation of the foregoing method, the method further includes: parsing a query associated with each event to map dimension metadata to the event; and storing the dimension metadata in a hypergeneralized database.

In another implementation of the foregoing method, the method further includes: identifying dimension metadata from a schema of the hypergeneralized database; and generating the presentation database based, in part, on the dimension metadata.

In another implementation of the foregoing method, the method further includes: generating a fact table associated with a plurality of dimension tables in the presentation database.

In another implementation of the foregoing method, the fact table comprises a measure that is defined in a query associated with an event.

In another implementation of the foregoing method, generating the plurality of dimension tables comprises deriving a dimension attribute name of one of the dimension tables from a column header.

In another implementation of the foregoing method, the method further includes: receiving an identification of the plurality of events and the one or more dependencies between each event via a GUI.

A computer-readable memory is disclosed herein. The computer-readable memory has program code recorded thereon that when executed by at least one processor causes the at least one processor to perform a method comprising: generating an event model that comprises a plurality of events and one or more dependencies between each event; mapping a plurality of dimensions to each of the events; executing a query to obtain event records related to the event model; generating a presentation database for the event model; and generating a tabular model using the presentation database.

In one implementation of the foregoing computer-readable memory, the method further includes: parsing a query associated with each event to map dimension metadata to the event; and storing the dimension metadata in a hypergeneralized database.

In another implementation of the foregoing computer-readable memory, the method further includes: identifying dimension metadata from a schema of the hypergeneralized database; and generating the presentation database based, in part, on the dimension metadata.

In another implementation of the foregoing computer-readable memory, the method further includes: generating a fact table associated with a plurality of dimension tables in the presentation database.

In another implementation of the foregoing computer-readable memory, the fact table comprises a measure that is defined in a query associated with an event.

In another implementation of the foregoing computer-readable memory, generating the plurality of dimension tables comprises deriving a dimension attribute name of one of the dimension tables from a column header.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system for generating a tabular model, the system comprising:
   one or more processors;
   one or more memory devices that store program code configured to be executed by the one or more processors, the program code comprising:
      an event model generator configured to generate an event model that comprises a plurality of events and one or more dependencies between each event;
      an event recorder configured to:
         for each event, decode dimension metadata by parsing a query associated with the event, the decoded dimension metadata including a mapping of a plurality of dimensions to each of the events, and
         encode a format of a staging database based on the decoded dimension metadata;
         execute each query to obtain event records related to the event model, the event records being stored in the staging database encoded with the format based on the decoded dimension metadata;
      a warehouse builder configured to automatically generate a presentation database for the event model based at least on the event records stored in the staging database; and
      a tabular model builder configured to generate a tabular model using the presentation database; and
   a storage device for storing the tabular model.

2. The system of claim 1, wherein
   the staging database comprises a hypergeneralized database.

3. The system of claim 2, wherein the warehouse builder is configured to:
   identify the dimension metadata from a schema of the hypergeneralized database, and
   generate the presentation database based, in part, on the decoded dimension metadata.

4. The system of claim 1, wherein the warehouse builder is configured to generate a fact table associated with a plurality of dimension tables in the presentation database.

5. The system of claim 4, wherein the fact table comprises a measure that is defined in a query associated with an event.

6. The system of claim 4, further comprising a dimension mapper configured to derive a dimension attribute name of one of the dimension tables from a column header.

7. The system of claim 1, further comprising a graphical user interface (GUI) configured to receive an identification of the plurality of events and the one or more dependencies between each event.

8. A method implemented by one or more computing devices for generating a tabular model, the method comprising:
   generating an event model that comprises a plurality of events and one or more dependencies between each event;
   for each event, decoding dimension metadata by parsing a query associated with the event, the decoded dimension metadata including a mapping of a plurality of dimensions to each of the events;
   encoding a format of a staging database based on the decoded dimension metadata;

executing each query to obtain event records related to the event model, the event records being stored in the staging database encoded with the format based on the decoded dimension metadata;

generating a presentation database for the event model based at least on the event records stored in the staging database; and generating a tabular model using the presentation database.

9. The method of claim 8, wherein the staging database comprises a hypergeneralized database.

10. The method of claim 9, further comprising:
identifying the dimension metadata from a schema of the hypergeneralized database; and
generating the presentation database based, in part, on the decoded dimension metadata.

11. The method of claim 8, further comprising:
generating a fact table associated with a plurality of dimension tables in the presentation database.

12. The method of claim 11, wherein the fact table comprises a measure that is defined in a query associated with an event.

13. The method of claim 11, wherein generating the plurality of dimension tables comprises deriving a dimension attribute name of one of the dimension tables from a column header.

14. The method of claim 8, further comprising:
receiving an identification of the plurality of events and the one or more dependencies between each event via a graphical user interface (GUI).

15. A computer-readable memory having computer program code recorded thereon that when executed by at least one processor causes the at least one processor to perform a method comprising:
generating an event model that comprises a plurality of events and one or more dependencies between each event;

for each event, decoding dimension metadata by parsing a query associated with the event, the decoded dimension metadata including a mapping of a plurality of dimensions to each of the events;

encoding a format of a staging database based on the decoded dimension metadata;

executing each query to obtain event records related to the event model, the event records being stored in the staging database encoded with the format based on the decoded dimension metadata;

generating a presentation database for the event model based at least on the event records stored in the staging database; and generating a tabular model using the presentation database.

16. The computer-readable memory of claim 15, wherein the staging database comprises a hypergeneralized database.

17. The computer-readable memory of claim 16, further comprising:
identifying the dimension metadata from a schema of the hypergeneralized database; and
generating the presentation database based, in part, on the decoded dimension metadata.

18. The computer-readable memory of claim 15, further comprising:
generating a fact table associated with a plurality of dimension tables in the presentation database.

19. The computer-readable memory of claim 18, wherein the fact table comprises a measure that is defined in a query associated with an event.

20. The computer-readable memory of claim 18, wherein generating the plurality of dimension tables comprises deriving a dimension attribute name of one of the dimension tables from a column header.

* * * * *